US006956921B1

(12) United States Patent (10) Patent No.: US 6,956,921 B1
Hansson (45) Date of Patent: Oct. 18, 2005

(54) CLOCK AND DATA RECOVERY CIRCUIT

(75) Inventor: Einar Hansson, Munich (DE)

(73) Assignee: Agere Systems Inc., Allentown, PA (US)

( * ) Notice: Subject to any disclaimer, the term of this patent is extended or adjusted under 35 U.S.C. 154(b) by 786 days.

(21) Appl. No.: 09/677,734

(22) Filed: Oct. 2, 2000

(30) Foreign Application Priority Data

Oct. 5, 1999 (EP) .................................. 99307835

(51) Int. Cl.[7] .............................................. H03D 3/24
(52) U.S. Cl. ..................................................... 375/373
(58) Field of Search ............................... 375/302, 219, 375/245, 246, 373, 371, 375, 354, 355, 362, 375/226, 224, 377

(56) References Cited

U.S. PATENT DOCUMENTS 3,746,800 A * 7/1973 Stuart ........................... 375/371

| 4,821,297 A | 4/1989 | Bergmann et al. ........... 375/120 |
| 5,247,544 A | 9/1993 | LaRosa et al. ............... 375/118 |
| 5,870,441 A * | 2/1999 | Cotton et al. ................ 375/354 |
| 6,424,684 B1 * | 7/2002 | Baker .......................... 375/340 |

OTHER PUBLICATIONS

European Search Report, dated Mar. 08, 2000.

* cited by examiner

*Primary Examiner*—Tesfaldet Bocure
*Assistant Examiner*—Pankaj Kumar

(57) ABSTRACT

The invention concerns a clock and data recovery circuit as well as a method for clock and data recovery using three or more clock phases of a reference clock for locking a data signal and the clock signal yielding a very stable phase alignment of the data and clock signals. In accordance with the invention, two of the clock phases are selected to be 180 degrees out of phase with the third clock phase, plus or minus a parameter M. The data signal is sampled at each of the three or more clock phases and a phase selection signal is generated based on a truth table. The state of the data signal in a previous cycle may further be included in the truth table.

25 Claims, 4 Drawing Sheets

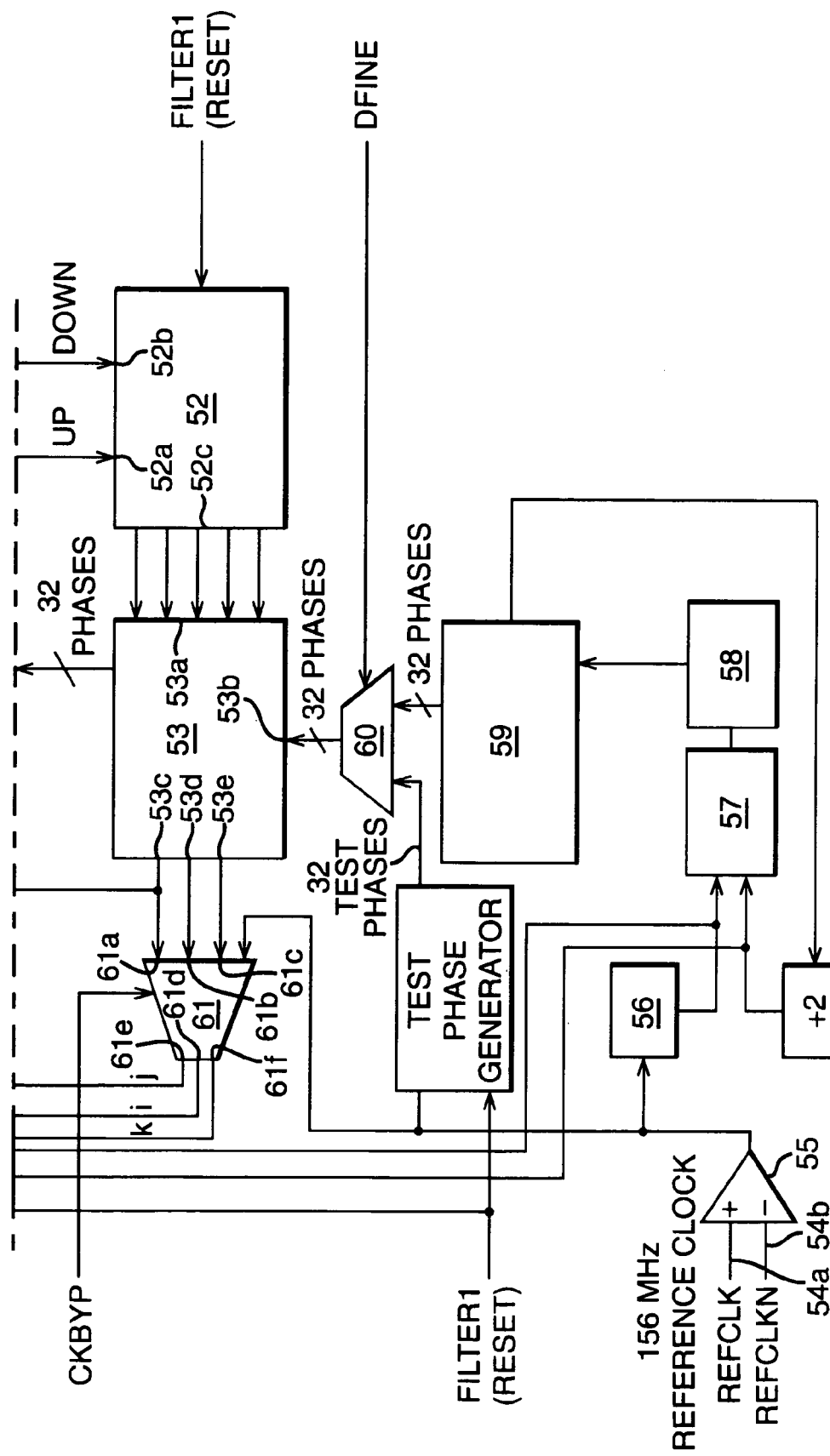
FIG. 1 (CONTD)

D-1　　　　　　D-0　　　　　　D+1

CLOCK AND DATA RECOVERY CIRCUIT

CROSS-REFERENCE TO RELATED APPLICATION

This application claims priority of European Patent Application No. 99307835.1, which was filed on Oct. 5, 1999.

The invention concerns a clock and data recovery circuit and method for clock and data recovery with an improved clock-data alignment. Digital clock aligners (DCA) are used for many applications e.g. whenever data signals are transmitted between different electronic components for clocking a data signal relative to or with a reference clock. Digital clock aligners are especially necessary for data transfer within and between computer networks, but also within electronic devices when a data signal is transferred between different components or locations. Due to the ever increasing demand for an improved data transfer the requirements for a clock-data alignment are increasing correspondingly. Today, typical data transfer rates are in the range of hundreds to thousands of Megabits per second causing only less than a few nanoseconds per transferred bit.

However, very often each data processing component has it's own operating frequency, typically defined by a reference clock and in many cases of data transmission by a local reference clock. With this reference clock e.g. processors and/or memory or other data handling components are clocked. When data are transferred from a transmitting component to a receiving component the clocking of both components must be synchronous or quasi synchronous for a proper handling of the data in the receiving component, e.g. for sorting in an associated register. Even if two components are intend to operate at the same frequency the internal clocks frequently are not precise enough to guarantee synchronization over a long term period. Therefore, the data signal is usually synchronized with a reference clock and both data signal and clock signal are transmitted to the receiving component.

A typical digital clock aligner is distributed by Lucent Technologies and described in the product description 1243A "156 Mbit/s One Channel Digital Timing Recovery". Such prior art digital timing recovery unit aligns an input data signal to a local reference clock and outputs a retimed data and a recovered clock signal. Moreover, the output data is phase-aligned with the output clock. This digital clock aligner uses a 156 MHz reference clock and divides a clock cycle into 32 phases. The rising and falling edge of a single clock phase is used to trigger the data sampling for aligning the data signal to the clock. The signal is sampled by a phase detector, which includes a truth table yielding a binary output value providing for the regular commands up and down which are transferred to a counter connected to the phase detector. The truth table also contains "no action" as possible result, but this is however, not a regular output once the data signal and the clock are locked in desired position, but is only the output of an error state when the alignment of the data signal and the clock is deteriorated. Once the data signal is locked to the reference clock the counter necessarily jumps up or down, typically, it jumps alternately up and down when the alignment is centered around the desired position.

Such a prior art device for clock/data recovery is disadvantageous in certain regards, as the recovered clock and the aligned data signal are permanently jittering due to the jumps up and down causing an data signal having a reduced temporal or phase related accuracy. Therefore, also components receiving the recovered clock and the aligned data signal often have own digital clock aligners and, typically, at least additional data buffers as the transferred signals have to be improved in temporal and/or phase related accuracy which causes additional costs and extended circuitry.

An object of the invention is therefore, to provide a clock and data recovery circuit with an improved alignment between the data and the clock signals reducing disadvantages of the prior art digital clock aligner.

The object of the invention is achieved by a clock and data recovery circuit according to claim 1 and a method for clock and data recovery according to claim 13 yielding a surprisingly stable alignment of the data and the clock signals.

SUMMARY OF THE INVENTION

The clock and data recovery circuit comprises a data input for receiving a data signal and a reference clock signal which reference clock signal also simplified only is called a "reference clock" and is defining a timing signal for strobing the data signal. The clock and data recovery circuit further comprises a phase generator which divides a clock cycle into N phases. The number N is preferably a power of two e.g. N=32 and the clock and data recovery circuit further comprises a data sampling component which having a buffer component and a phase detector. The received data signal is buffered by the buffer component for sampling the data signal. The data signal states sampled cause a logic output statement of the data sampling component based on a truth table. The clock and data recovery circuit further comprises a counter assigned to the phase detector processing the output statement of the data sampling component. The clock and data recovery circuit further comprises a phase selector assigned to the counter selecting three or more clock phases, wherein theses clock phases are triggering the data sampling preferably by switching the buffer component.

The output statement of the phase detector preferably causes a counting up, counting down or holding of the counter. Especially the holding of the counter, when the data signal is in a locked desired position, is advantageous because the jitter of the output data signal and a recovered clock signal is drastically reduced.

The data signal is preferably a binary signal defining a bit sequence comprising the state zero and one, since binary signals are of major interest for fast data transmission.

In a preferred embodiment of the clock and data recovery circuit the buffer component comprise a bistable multivibrator or preferably consists of a number of bistable multivibrators, as bistable multivibrators are simple and cheap triggerable digital buffers. A preferred example of a bistable multivibrator has a data input, a data output and a trigger input.

In a further preferred embodiment the buffer component comprises or is preferably partitioned in three groups of bistable multivibrators each group preferably being triggered by one of the three clock phases respectively, when only three clock phases are used. It shall be understood that it might be further advantageous to use more than three clock phases to improve the stability of the data alignment. The bistable multivibrators are preferably switching and therefore buffering the data signal when triggered by the clock phase at the trigger input.

In a further preferred embodiment, the three clock phases i, j and k depend on each other as:

$$J=i+N/2-M \text{ and } k=i+N/2+M \text{ if } i{:}\leq N/2$$

and $$j=i-N/2-M \text{ and } k=i-N/2+M \text{ if } i>N/2$$

with a parameter M selectable within 0<M<N/2.

This choice of the three clock phases is advantageous as the clock phase j and k are symmetrically distributed around i+N/2 or i−N/2. The parameter M defines the distance between the clock phase j and k.

In a further preferred embodiment, the retimed data signal is transmitted from the buffer portion to an output of the clock and data recovery circuit, wherein the retimed data signal is triggered by the clock phase i. This is advantageous as in the desired locked position the clock phase i is near the center of a data bit, i.e. providing for a good alignment of the data signal and the clock signal.

Furthermore, it is advantageous to detect the buffered data signal switched to the data outputs of the three buffer portions by the phase detector. It is advantageous to further detect the data signal state of a previous cycle of the timing signal, preferably at the previous clock phase i. The resulting four sampled data signal states can be further processed e.g. looked up in a predefined truth table.

In a further preferred embodiment the clock and data recovery circuitry comprises a low pass filter assigned to the phases detector for preferably filtering the output statement of the phases detector.

Moreover, it is advantageous to use dual rail amplifiers at the data input and/or the data output and/or the recovered clock signal output. The dual rail amplifiers are preferably operating according to the low voltage differential swing (LVDS) standard and advantageously suppress common mode interference signals.

The clock and data recovery circuit and the method for clock and data recovery according to the invention can be used for many applications, e.g. for synchronous optical network (SONET), synchronous digital hierarchic networks (SDH), networks operated in the synchronous transfer mode (ATM), local area networks (LAN) or plesiochronous digital hierarchic networks (PDH). Due to the stability of the retimed output data signal and the recovered timing signal it is even possible to receive these signals and directly process them without retiming them in a receiving component.

The invention is described in detail hereinafter by means of preferred embodiments and reference is made to the attached detailed drawings where necessary.

BRIEF DESCRIPTION OF THE FIGURES

It is shown in

FIG. 1: a block diagram of a preferred embodiment of the clock and data recovery circuit according to the;

FIG. 3b: the relative alignment of the clock phases of FIG. 3a.

DETAILED DESCRIPTION OF THE PREFERRED EMBODIMENTS

Figure 1:
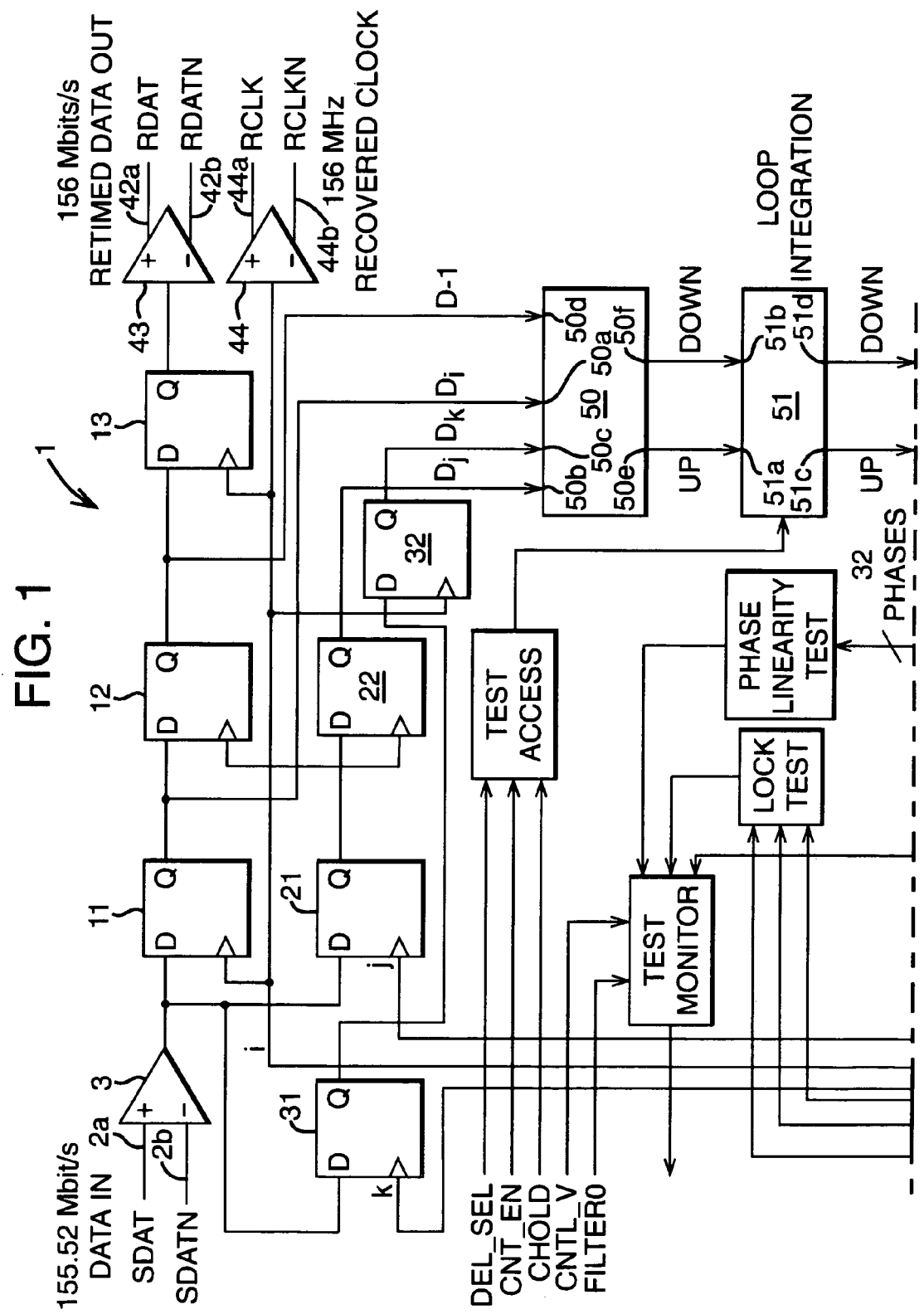

FIG. 1 shows a clock and data recovery circuit 1 with a first data input including a positive data input 2a and an inverted data input 2b operating preferably according to the well known low voltage differential swing standard (LVDS) and also shows a first dual rail input amplifier 3. In the preferred embodiment the input data signal has a data rate of about 155.52 Mbit/s. The amplifier 3 is connected to a first buffer portion comprising a first, a second and a third bistable multivibrator 11, 12, 13. The amplifier 3 is further connected to a second buffer portion comprising a fourth and fifth bistable multivibrator 21, 22 and is connected to a third buffer portion on comprising a sixth and seventh bistable multivibrator 31, 32. Each bistable multivibrator has a data input "D", a data output "Q" and a trigger input ">". Those skilled in the art will recognize each buffer portion also as a first-in-first-out (FIFO) register. The data output of the third bistable multivibrator 13 is connected to a second dual rail amplifier 43 which amplifies the data signal for transmitting having a positive data output 42a and an inverted data output 42b, e.g. in LVDS-standard.

A phase detector 50 comprises a first, a second, a third and a fourth input 50a, 50b, 50c, 50d to which the output of the first bistable multivibrator 11, the output of the fifth bistable multivibrator 22, the output of the seventh bistable multivibrator 32 and the output of the second bistable multivibrator 12 are connected, respectively. The output 50e, 50f of the phase detector 50 is connected to the input 51a, 51b of a four bit up/down counter 51 which serves as a low pass filter. The output 51c, 51d of the up/down counter 51 is connected with the input 52a, 52b of a five bit up/down counter 52. The output 52c of the counter 52 is connected to the first input 53a of a phase clock selector (or phase selector) 53.

A reference clock signal, e.g. in LVDS standard, having a positive and an inverted signal input 54a, 54b is amplified by a dual rail amplifier 55 which is connected via a component 56 to a phase/frequency detector 57 which is connected to a loop filter 58.

The loop filter 58 is connected to a 156 MHz voltage controlled oscillator (VCO) 59 which is connected via a multiplexer 60 to a second input 53b of the phase clock selector 53. Those skilled in the art will understand that the elements 55–60 form a phase locked loop (PLL) component.

Outputs 53c, 53d, 53e of the phase clock selector 53 are connected to inputs 61a, 61b, 61c of a PLL bypass 61, respectively, said PLL bypass 61 having a first, a second and a third output 61d, 61e, 61f. The first output 61d is connected to the trigger inputs of the first, the second, the third, the fifth and the seventh bistable multivibrators 11, 12, 13, 22, 32 and to a dual rail amplifier 44. The dual rail amplifier 44 transmits the recovered clock signal of the phase clock selector 53 having a positive and an inverted signal output 44a, 44b. The second output 61e of the PLL bypass 61 is connected to the trigger input of the fourth bistable multivibrator 21. The third output 61f of the PLL bypass 61 is connected to the trigger input of the sixth bistable multivibrator 31.

The PLL component 55–60 creates a 156 MHz timing signal divided into a number of N phases. The number N is preferably a power of two and is in this preferred embodiment N=32. The phase clock selector comprises three multiplexers (not shown) selecting three clock phases i, j and k of the 32 phases.

A data signal received by the data input and amplified by the amplifier 3 is put on the inputs D of the bistable multivibrators 11, 21, 31. When the phase clock selector 53 serves the clock phase i via the PLL bypass 61 to the trigger inputs of the bistable multivibrator 11 the actual state of the data signal (0 or 1) is switched to the data output Q anc is buffered therewith. In other words the data signal is strobed at the time of the clock phase i and the strobed state of the data signal called D−1 (or in a more precise notation $D_{i-1}$,) is buffered. When the clock phase j is served to the trigger input of the fourth bistable multivibrator 21 the data signal is strobed again and the bistable multivibrator 21 buffers the data signal state $D_j$ at it's output Q. When the clock phase k is served to the trigger input of the sixth bistable multivibrator 31 the data signal is strobed again and the bistable multivibrator 31 buffers the data signal state $D_k$ at it's output Q. When the next clock phase i is served with the following clock cycle the data signal states, D−1, $D_j$, $D_k$ are switched through the second, the fifth and the seventh bistable multivibrator 12, 22, 32, respectively and are buffered therewith at the respective outputs Q. Also the data signal at the input D of the first bistable multivibrator 11 is strobed again by the clock phase i and the next signal state called $D_i$ is buffered by the first bistable multivibrator 11 at it's output Q. Now the states $D_i$, $D_j$, $D_k$ and D−1 are buffered and are sitting at the inputs 50a, 50b, 50c, 50d of the phase detector 50, respectively, and can be read out by the phase detector 50. Preferably, the phase detector 50 is also strobed by the clock phase i, especially by a delayed clock phase i.

The phase detector reads a four digit binary number resulting from the four digital states D−1, $D_i$, $D_j$ and $D_k$ and creates an output statement based on the following truth table (table 1).

TABLE 1

| Number | D−1 | $D_i$ | $D_j$ | $D_k$ | $C_u$ | $C_d$ |
|---|---|---|---|---|---|---|
| 1  | 0 | 0 | 0 | 0 | 0 | 0 |
| 2  | 0 | 0 | 0 | 1 | 0 | 0 |
| 3  | 0 | 0 | 1 | 0 | 0 | 0 |
| 4  | 0 | 0 | 1 | 1 | 0 | 0 |
| 5  | 0 | 1 | 0 | 0 | 1 | 0 |
| 6  | 0 | 1 | 0 | 1 | 0 | 0 |
| 7  | 0 | 1 | 1 | 0 | 0 | 0 |
| 8  | 0 | 1 | 1 | 1 | 0 | 1 |
| 9  | 1 | 0 | 0 | 0 | 0 | 1 |
| 10 | 1 | 0 | 0 | 1 | 0 | 0 |
| 11 | 1 | 0 | 1 | 0 | 0 | 0 |
| 12 | 1 | 0 | 1 | 1 | 1 | 0 |
| 13 | 1 | 1 | 0 | 0 | 0 | 0 |
| 14 | 1 | 1 | 0 | 1 | 0 | 0 |
| 15 | 1 | 1 | 1 | 0 | 0 | 0 |
| 16 | 1 | 1 | 1 | 1 | 0 | 0 |

$D_i$, $D_j$ and $D_k$ are the states of the data signal at the clock phases i, j and k, respectively. D−1 is the state of the bit previous to the bit of state $D_i$. $C_u$ and $C_D$ are counter up and counter down output statements respectively. $(C_u, C_D)=(1, 0)$ means a counting up, $(C_u, C_D)=(0, 1)$ means a counting down and $(C_u, C_D)=(0, 0)$ means a holding of the counter. The table values-number 7 and 10, causing a holding of the counter are error states that should not occur when the clock and data recovery is in a stable position. The possible output statements counter up, counter down or hold counter are transmitted to the four bit counter 51 for filtering and from there to the five bit counter 52. The reaction of the five bit counter 52 executing the up, down or hold statement is transmitted to the phase clock selector 53 which is shifting the clock phases i, j and k due to the counter output statement. Clocked by the next clock phase i the data signal buffered at the output Q of the second bistable multivibrator 12 is switched by the third bistable multivibrator 13 to the output amplifier 43 and is aligned to the clock phase i amplified by the dual rail amplifier 44 defining a recovered clock signal. The retimed data signal at the output amplifier 43 is now synchronous to the recovered clock signal at the output amplifier 44.

Figure 2A:
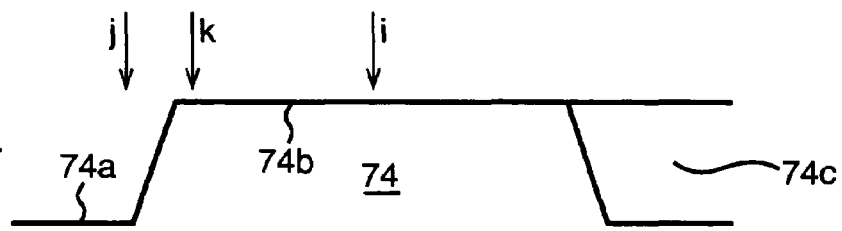
FIGS. 2a–f: six examples of the phase alignment of clock phases and a data signal as appearing in the embodiment of FIG. 1.
Figure 2B:
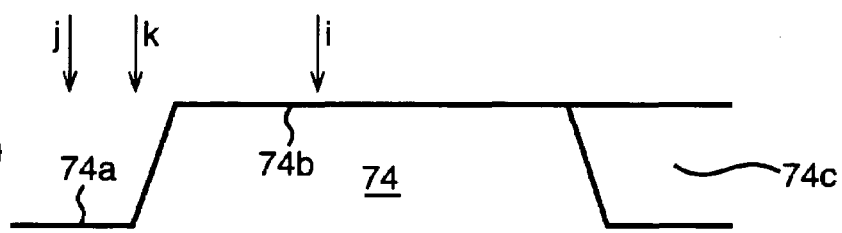
Figure 2C:
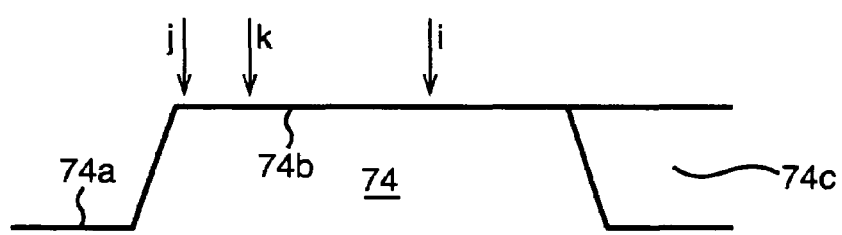

FIGS. 2a–f shows the timing between the clock phases i, j and k indicating arrows and a data signal 74. Six possible timing situations between the clock phases i, j and k and the data signal are shown. Portions of three data bits 74a, 74b, 74c of the data signal 74 are shown. In FIGS. 2a–c the state of the first bit (D−1) 74a is zero, the state of the second bit (D−0) 74b is one, while in FIGS. 2d–f the state of the first bit (D−1) 74a is one and the state of the second bit (D−0) 74b is zero. In FIGS. 2a–f the third bit is shown with both possible states zero and one, since the state of the third bit D+1 does not affect the sampling and the synchronization of the bit D−0 visualized in FIGS. 2a–f, however, the following bit D+1 affects the sampling of bit D+1 in the next recovering cycle.

The state of the data signal is sampled at the clock phases i, j, k and of the bit D−1, preferably by the clock phase i of the previous clock cycle (not shown). The four digit result of the sampling of FIG. 2a is (D−1, $D_i$, $D_j$, $D_k$)=(0, 1, 0, 1) which causes no counter action looking up in the truth table (table 1). The clock phase i is about in the center of the bit D−0, which is in the desired position near the center of the bit D−0. This desired position is advantageous for later strobing when the data is transmitted by the clock and data recovery circuit. Therefore, the counter is held caused by the result of value number 6 of table 1, which is one of the two desired locked positions (the other one is given by the result of value number 11). Since the frequency of the clock signal is very close to the data rate the desired position can be held for many cycles without changing the counter state.

When the frequency of the clock signal is slightly faster than the data rate the clock phases will drift to the left (to an earlier timing) relative to the data signal. As soon as the data signal state $D_j$ at the clock phase j becomes zero shown in FIG. 2b the four digit value is (D−1, $D_i$, $D_j$, $D_k$)=(0, 1, 0, 0) causing a counting up of the counter looking up the four digit value in the truth table pushing back the clock phases in direction of the desired position. A similar situation as in FIG. 2b is shown in FIG. 2c except the clock phases are later than the desired position resulting a four digit value of (D−1, $D_i$, $D_j$, $D_k$)= (0, 1, 1, 1) and causing a counting down of the counter. Thus FIGS. 2a–c show the oscillation of the clock phases j and k around a rising edge of the data bit therebetween.

Due to the described algorithm the clock and data recovery circuit according to the invention only changes the counter state when necessary resulting in a much more stable synchronization, in advantageous contrast to the cited prior art digital clock aligner. Especially when the data rate and the reference clock frequency are close together, e.g. a clock frequency of 156 MHz and a data rate of 155.52 Mbit/s (as used for the preferred embodiment) the relative drift between the data signal and the clock signal is about 3.1E−3, resulting in a counting up approximately only each $325^{th}$ clock cycle and having a stable alignment with held counter for a duration of about 324 clock cycles.

Figure 2D:
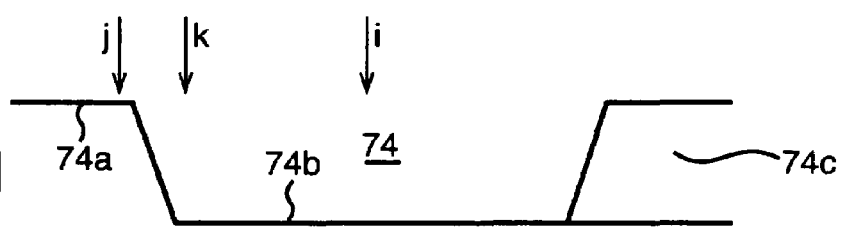
Figure 2E:
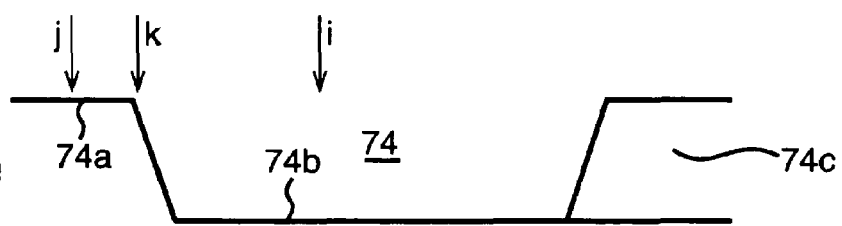
Figure 2F:
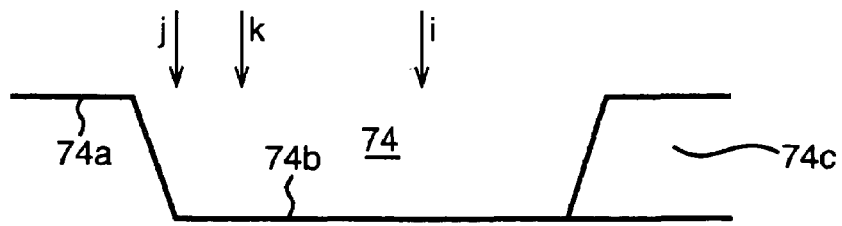

FIGS. 2d–f show an equivalent situation as shown in FIGS. 2a–c except that the clock phases j and k are oscillating around a falling edge of the data signal locking the clock phase i near the center of the bit D−0. FIG. 2d shows the stable position (D−1, $D_i$, $D_j$, $D_k$)=(1, 0, 1, 0) holding the counter $(C_u, C_D)$=(0, 0). FIG. 2e shows the situation where the clock phases are too early (D−1, $D_i$, $D_j$, $D_k$)=(1, 0, 1, J) causing a counting up and FIG. 2f where the clock phases are too late (D−1, $D_i$, $D_j$, $D_k$)=(1, 0, 0, 0) causing a counting down of the counter.

Figure 3A:
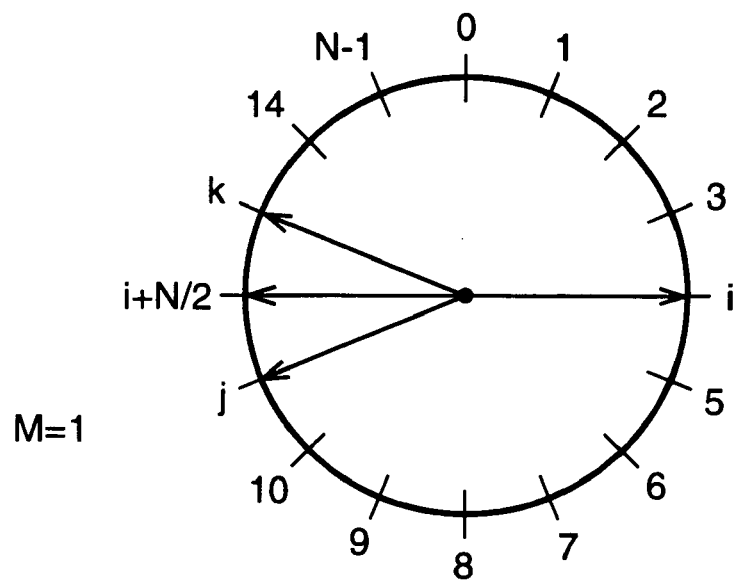
FIG. 3a: a circle diagram of an exemplary chosen set of clock phases.

FIG. 3a shows a preferred choice of the clock phases i, j and k in a phase circle diagram. It is exemplary chosen N=16 and M=1. i reads i=4, resulting in i+N/2=12 on the opposite side to i in the diagram. j=11 and k=13 are resulting from the chosen M= 1 creating a window of two phase intervals therebetween locking the rising or falling edge of a bit as shown in FIGS. 2a–f. If M is chosen larger than 1 the size of the locking window increases resulting in a longer duration of the stable position holding the counter, but also resulting in a larger range of relative jitter between the clock phase i and the data signal. Without claiming completeness the choice of M can be adapted to the difference of the data rate and the reference clock frequency and/or to the quality of the data signal with M from 1 to N/2−1.

Figure 3B:
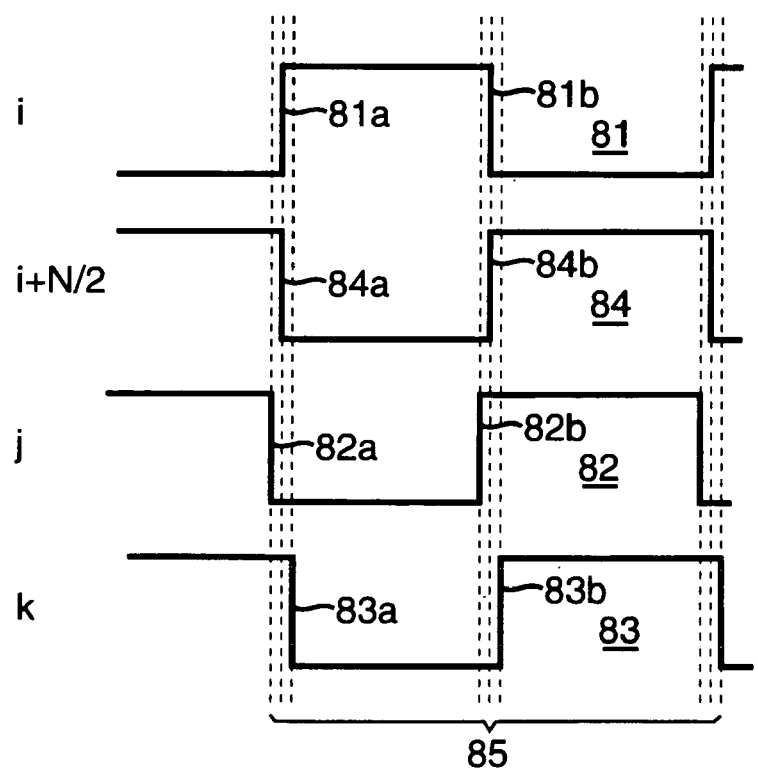

FIG. 3b shows the relevant timing of the clock phase signals i, i+N/2, j and k 81, 84, 82, 83 of a little more than one clock cycle 85. The clock cycle 85 goes from a rising edge to the next rising edge or from a falling edge to the next falling edge. The respective bistable multivibrators of FIG. 1 will trigger on the rising edges of the clock phases i, j and k 81a, 82b, 83b. It shall be understood that the invention is not restricted to the preferred embodiments described, but can be realized in many different ways.

What is claimed is:

1. A clock and data recovery circuit comprising:
    a first data input receiving a data signal of a first frequency;
    a clock defining a timing signal of a second frequency;
    a phase generator dividing a cycle of the timing signal into a number of N clock phases;
    a data sampling component sampling a portion of said data signal causing a logic output statement based on a truth table, said data sampling component comprising
        a buffer component for buffering said data signal, said buffer component triggered by a first clock phase i, a second clock phase j and a third clock phase k, resulting in a buffering of the state of said data signal at said clock phases i, j, and k and wherein the clock phases i, j, and k are interdependent by at least one of the equations:

$$j=i+N/2-M \text{ and } k=i+N/2 \text{ if } i \leq N/2 \text{ and}$$

$$j=i-N/2-M \text{ and } k=i-N/2+M \text{ if } i>N/2$$

with a parameter M selectable within 0<M<N/2, and
    a phase detector coupled to said buffer component; and
    a phase selector coupled to said data sampling component.

2. A clock and data recovery circuit as claimed in claim 1, further comprising:
    a counter coupled between said data sampling component and said phase selector, wherein said logic output statement of said data sampling component causes said counter to count up, count down or hold.

3. A clock and data recovery circuit as claimed in claim 1, wherein
    the data signal is a binary signal having signal states zero or one defining a bit sequence.

4. A clock and data recovery circuit as claimed in claim 1, wherein
    said buffer component comprises bistable multivibrators.

5. A clock and data recovery circuit as claimed in claim 1, wherein
    said buffer component comprises a first, a second and a third buffer portion each having a data input and a data output, with the data inputs of the three buffer portions coupled to said first data input.

6. A clock and data recovery circuit as claimed in claim 5, wherein the signal states of the data signal at the data outputs of said first, second and third buffer portions are detected by said phase detector.

7. A clock and data recovery circuit as claimed in claim 1, further comprising
    a low pass filter coupled to said phase detector.

8. A clock and data recovery circuit as claimed in claim 1, further comprising a first output receiving the data signal from the buffer portion which is triggered by the clock phase i,
    wherein at least one of said data signal and said timing signal is transmitted by said first output.

9. A clock and data recovery circuit as claimed in claim 6, wherein
    the phase detector further detects the signal state of the data signal at the clock phase i of the previous cycle of the timing signal.

10. A clock and data recovery circuit as claimed in claim 1, further comprising
    dual rail amplifiers.

11. A method for dock and data recovery comprising the steps of:
    receiving a data signal of a first frequency;
    defining a timing signal of a second frequency;
    dividing a cycle of the timing signal into a number of N clock phases;
    sampling a portion of said data signal by a data sampling component resulting in a binary number, said data sampling component comprising a buffer component buffering said data signal and comprising a phase detector that looks up said binary number in a truth table yielding a logic output statement; and
    transmitting said logic output statement to a phase selector;
    wherein the data signal is a binary signal having signal states zero or one defining a bit sequence and wherein said data signal is buffered by a first, a second and a third group of bistable multivibrators, triggered by a first clock phase i, a second clock phase j and a third clock phase k, respectively, resulting in a buffering of the state of said data signal at said clock phases i, j, and k.

12. A method as claimed in claim 11, wherein said transmitting step comprises the steps of (a) incrementing; decrementing, or holding a counter value in response to said logic output statement of the truth table and (b) transferring the counter value to the phase selector.

13. A method for clock and data recovery comprising the steps of:
    receiving a data signal of a first frequency;
    defining a timing signal of a second frequency;
    dividing a cycle of the timing signal into a number of N clock phases;
    sampling a portion of said data signal by a data sampling component resulting in a binary number, said data sampling component comprising a buffer component buffering said data signal and comprising a phase detector;
    looking up said binary number in a truth table yielding a logic output statement; and
    transmitting said logic output statement to a phase selector;
    wherein the data signal is a binary signal having signal states zero or one defining a bit sequence and wherein the buffer component is triggered by a first clock phase i, a second clock phase j and a third clock phase k, resulting in a buffering of the state of said data signal at said clock phases i, j, and k; and wherein the clock phases j and k are further defined by at least one of the equations:

$j=i+N/2-M$ and $k=i+N/2$ if $i \leq N/2$ and $j=i-N/2-M$ and $k=i-N/2+M$ if $i>N/2$ with selecting a parameter M within 0<M<N/2.

14. A method as claimed in claim 11 or 13, further comprising the step of
transmitting at least one of said data signal and said timing signal by an output with the transmission triggered by the clock phase i.

15. A method for clock and data recovery further comprising the steps of:
receiving a data signal of a first frequency;
defining a timing signal of a second frequency;
dividing a cycle of the timing signal into a number of N clock phases;
sampling a portion of said data signal by a data sampling component comprising a buffer component buffering said data signal and comprising a phase detector, said step of sampling further including detecting the state of the data signal at a clock phase i of the previous cycle of the timing signal, resulting in a four digit binary number having sixteen possible values, wherein said phase detector looks up said four digit binary number in a truth table yielding a logic output statement; and
transmitting said logic output statement to a phase selector.

16. A dock and data recovery circuit comprising:
a first data input receiving a data signal of a first frequency;
a clock defining a timing signal of a second frequency;
a phase generator dividing a cycle of the timing signal into a number of N clock phases;
a data sampling component sampling a portion of said data signal, said data sampling component comprising a buffer component for buffering said data signal and comprising a phase detector, coupled to said buffer component,
wherein said phase detector produces a logic output statement based on a truth table, and
wherein the phase detector further detects the signal state of the data signal at a dock phase i of the previous cycle of the timing signal; and
a phase selector coupled to said data sampling component.

17. A clock and data recovery circuit as claimed in claim 16, further comprising:
a counter coupled between said data sampling component and said phase selector, wherein said logic output statement of said data sampling component causes said counter to count up, count down or hold.

18. A clock and data recovery circuit as claimed in claim 16, wherein the data signal is a binary signal having signal states zero or one defining a bit sequence.

19. A clock and data recovery circuit as claimed in claim 16, wherein
said buffer component comprises bistable multivibrators.

20. A clock and data recovery circuit as claimed in claim 16, said buffer component comprising a first, a second and a third buffer portion each having a data input and a data output, with the data inputs of the three buffer portions coupled to said first data input.

21. A clock and data recovery circuit as claimed in claim 20, wherein the signal states of the data signal at the data outputs of said first, second and third buffer portions are detected by said phase detector.

22. A clock and data recovery circuit as claimed in claim 16, further comprising a first output receiving the data signal from the buffer portion which is triggered by the clock phase i,
wherein at least one of said data signal and said timing signal is transmitted by said first output.

23. A clock and data recovery circuit as claimed in claim 16, further comprising
a low pass filter coupled to said phase detector.

24. A clock and data recovery circuit as claimed in claim 16, further comprising
dual rail amplifiers.

25. A clock and data recovery circuit comprising:
a first data input receiving a data signal of a first frequency;
a clock defining a timing signal of a second frequency;
a phase generator dividing a cycle of the timing signal into a number of N clock phases;
a data sampling component comprising
a buffer component buffering said data signal and
a phase detector that produces a logic output statement based on a truth table; and
a phase selector coupled to said data sampling component;
wherein said data signal is buffered by a first, a second and a third group of bistable multivibrators, triggered by a first clock phase i, a second clock phase j, and a third clock phase k, respectively, resulting in a buffering of the state of said data signal at said clock phases i, j, and k.

* * * * *